United States Patent [19]

Levin

[11] Patent Number: 5,042,911

[45] Date of Patent: Aug. 27, 1991

[54] METHOD OF MAKING LIGHTING LENS

[75] Inventor: Robert E. Levin, S. Hamilton, Mass.

[73] Assignee: GTE Products Corporation, Danvers, Mass.

[21] Appl. No.: 320,352

[22] Filed: Mar. 8, 1989

[51] Int. Cl.[5] .......................... G02B 27/00; G02B 3/02

[52] U.S. Cl. .................................... 359/619; 359/708; 359/741

[58] Field of Search ................ 350/167, 432, 451, 320

[56] References Cited

U.S. PATENT DOCUMENTS 3,807,834 4/1974 Nagel ................................. 350/167

*Primary Examiner*—Bruce Y. Arnold
*Assistant Examiner*—Rebecca D. Gass
*Attorney, Agent, or Firm*—William F. Meyer

[57] ABSTRACT

A method of making a lighting lens having a multiplicity of lenticules is disclosed, and in particular a method using spherical and aspherical lenticules is disclosed. The lenticules are of two or more standard types, each of which produce a characteristic beam pattern. By selecting two standard lenticule types, and determining a weighted ratio, a lens for a desired lighting pattern may be made without having to specifically design the individual lenticules, or the particular lenticule arrangement. In particular, separate sample lens, each with a sample of a particular lenticule type, may be formed to produce characteristic sample beam patterns. By forming a first sample lens with gaps between the lenticules, and forming a second sample lens with lenticules and gaps complementarily positioned with respect to the first sample lens, the first and second patterns may be intermeshed in a finale design, having the combined beam patterns. A weighted averaging process may also may be followed.

13 Claims, 7 Drawing Sheets

2:1

3:1

4:1

5:1

7:1

8:1

METHOD OF MAKING LIGHTING LENS

Basic aspects of the present invention are disclosed in a simultaneously filed application for Lighting Lens by the same applicant.

1. Technical Field

The invention relates to electric lamps and particularly to electric lamps designed to light a defined zone of illumination. More particularly, the invention is concerned with lens design for defined area lighting.

2. Background Art

Electric lamps, such as exterior flood lights, or interior area lights, are used to concentrate light in a particular illuminated zone. Usually the desired lighting is a relatively even level across the chosen zone, but most lamps produce irregular or inexact. First, the light is produced by a filament, or an arc discharge that is not a point source but has a shape with breadth and width resulting in a source image. Second, the reflector or lens may spread some sections of the light and concentrate others.

Lenses are commonly placed in front of the reflector to focus the beam on a particular zone, to shape the spacial intensity and to break up the source image. Random patterns, frosted surfaces, stippled surfaces, and other diffusing patterns are used. Another method uses a large number of spherical lens elements, called lenticules, distributed across the lens. Each lenticule acts as a separate projection source, but the lenticules as a group produce the zone illumination.

Spherical surface lenticules are relatively easy to manufacture and therefore have become the common lenticule form. Typically, spherical lenticules are used either as a complete covering for the lens face, or are added around the lens edge. Spherical lenticules produce a characteristic intensity distribution that tends to direct light to the center of the beam. The cumulative result is a center weighted spot, an unevenness in the illumination zone, that spherical lenticules cannot avoid. There is then a need to provide a lighting lens that diminishes the center weighted spot.

In commercial lighting, products or areas are lit with one or more individual lights. Often, the goal is an evenly controlled amount of light. The control sought for a lamp may require a particular shaped pattern with a particular intensity distribution within the pattern, for example, a rectangular pattern with even light. Even with a group of single center weighted spot lights, a reasonably rectangular pattern is not easily constructed. Another desirable pattern is a circular spot having a fixed angle of spread, with even light across the spot that drops off sharply at the edges. There is then a need for lighting lenses in general that have prescribed light distribution patterns.

Area lights commonly are designed by starting with an existing design and modifying the lens to achieve a new result. The old design is modified, and ray tracing by hand or by computer is performed to predict the result. The process is tedious, and expensive. A growing demand exists for a larger number of specialized lights, each type of which is produced in only small quantities. Lenses therefore need to be designed quickly and efficiently to meet customer needs. Lenticules may be used as lens elements to achieve part of the desired light distribution pattern, where the individually shaped light intensity distributions of the various lenticules of a lens are cumulated in the beam to form the final desired distribution. The easily manufactured and therefore conventional circular contour of constant curvature, produces a light distribution pattern concentrated in the beam center, and fading away at the beam edges. Unfortunately, the circular lenticule distribution pattern is not acceptable or adaptable to all purposes. By varying the contour with a variable curvature, the light intensity distribution I(Θ) of a lenticule may be shaped for a specific pattern, but it is industrially impractical to design, and manufacture a specialized lenticule to achieve each specialized result. There are too many possible patterns, and too small a production in specialized patterns to be economic. There is then a need for a lens design that may be quickly altered to meet new design criteria. There is a further need for a method of designing lighting lenses that may produce many variations of illumination quickly, and accurately.

Numerous examples of the prior art are known showing lens structures. U.S. Pat. No. 1,601,688 to Nystrom for Automobile Headlight Glass shows a regular pattern of intersecting ribs on a lens. U.S. Pat. No. 1,726,460 to Upp shows a headlight with cut vertical ribs that tilt in one direction on one side of the lens, and tilt in the opposite direction of the opposite side of the lens. U.S Pat. No. 1,745,278 to Sisson for Headlight Lens shows regular cut or molded intersecting vertical ribs on a headlight lens. U.S. Pat. No. 2,568,494 to Geissbuhler for Vehicle Head Lamp shows a lens with flutes cut vertically and horizontally in a regular progression to define a keystone pattern of illumination. U.S. Pat. No. 2,767,306 to Gaither et al for Composite Beam Vehicle Headlamp shows vertical and horizontal superimposed flutes, each with a different radius of curvature. U.S. Pat. No. 3,267,278 to Doolittle for Lens and Lens Assemblies shows a lens with regular cut facets to simultaneously distribute projected light, while reflecting incident light as a warning reflector. U.S. Pat. No. 3,383,676 to Nagel for Lenticular Signal Lens Having a Smooth Outer Surface shows a two piece lens with cut facets on adjacent lens faces. U.S. Pat. No. 4,484,254 to Puckett for PAR Flood Lamp shows a typical PAR lamp with spherical lenticules stationed around the edge of the lens, and concentric rings positioned near the center of the lens. U.S. Pat. No. 4,545,007 to Nagel for Luminaire with Lenticular Lens shows a lens with hexagonally close packed aspherical lenticules of a particular type. U.S. Pat. No. 4,651,261 to Szekacs for PAR Lamp shows a typical PAR lamp with spherical lenticules stationed around the edge of the lens, and having rib sections extending through portions of the lenticules to offset the light distribution from a filament mounted transverse to the optical axis. U.S. Pat. No. 4,769,750 to Matsumoto et al for Illumination Optical System shows two successive lenses with lenticule like facets used to locally alternate sections of a collimated beam.

DISCLOSURE OF THE INVENTION

An improved lighting lens may be formed as a light transmissive plate having a first side and a second side each side having a center point, and an optical edge, a multiplicity of aspherical lenticules distributed across the first side. Additionally, a lighting lens may be improved by including on the light transmissive plate a multiplicity of aspherical first lenticules, having a first curvature, distributed on the first side of the plate and intermixing a multiplicity of a second lenticule having a second and different curvature. Different lenticules may be combined in interchangeable sets to quickly provide satisfactory combinations.

FIGS. *2a*, *2b* show end views of lighting lenses with aspherical lenticules.

FIGS. *3a–f* show axial cross sectional views of several lenticule types.

FIGS. *4a–f* shows transverse cross sectional views of the corresponding several lenticule types of FIGS. *3a–f*.

FIGS. *5a–f* show a hexagonal close packings of two lenticule types in differing proportions.

Figure 6:
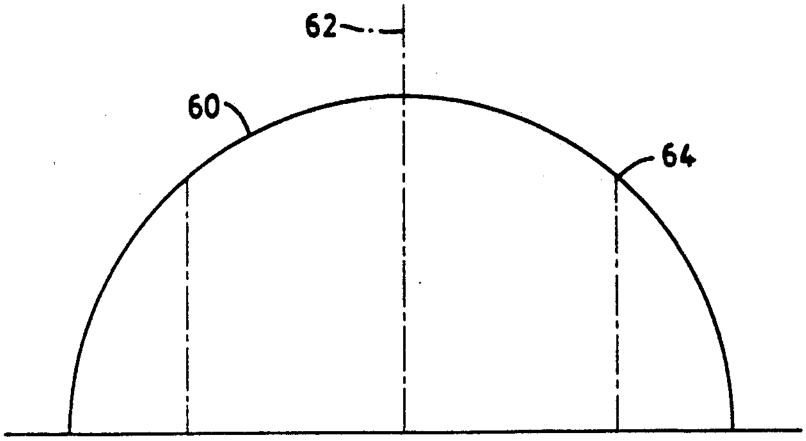

FIG. 6 shows a spherical lenticule in axial cross section.

Figure 7:
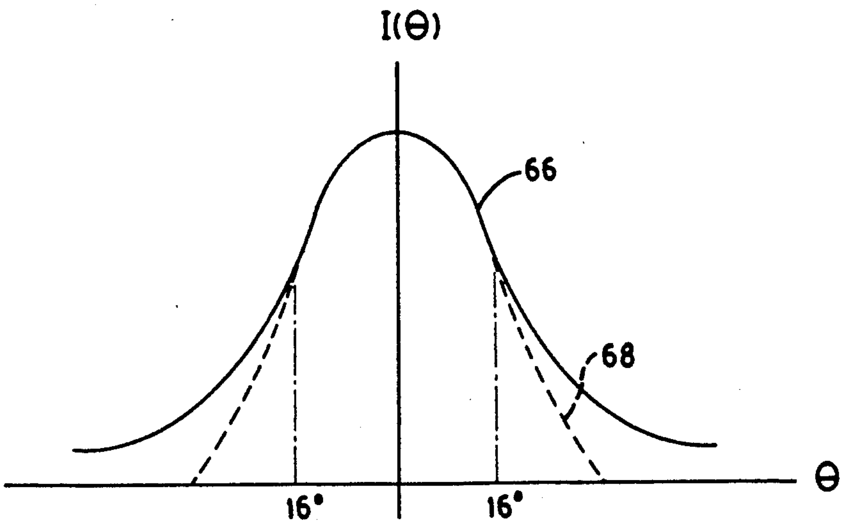

FIG. 7 shows a light intensity curve for a lens with spherical lenticules.

Figure 8:
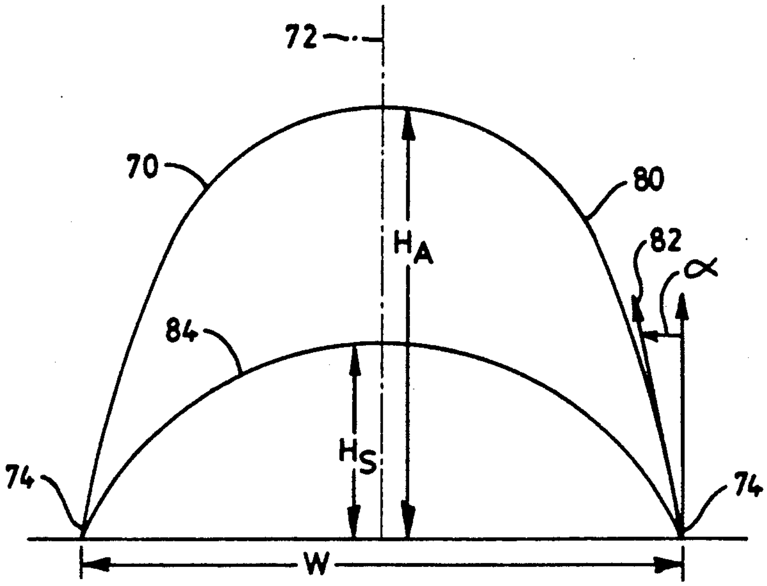

FIG. 8 shows an elongated parabolic lenticule in cross section.

Figure 9:
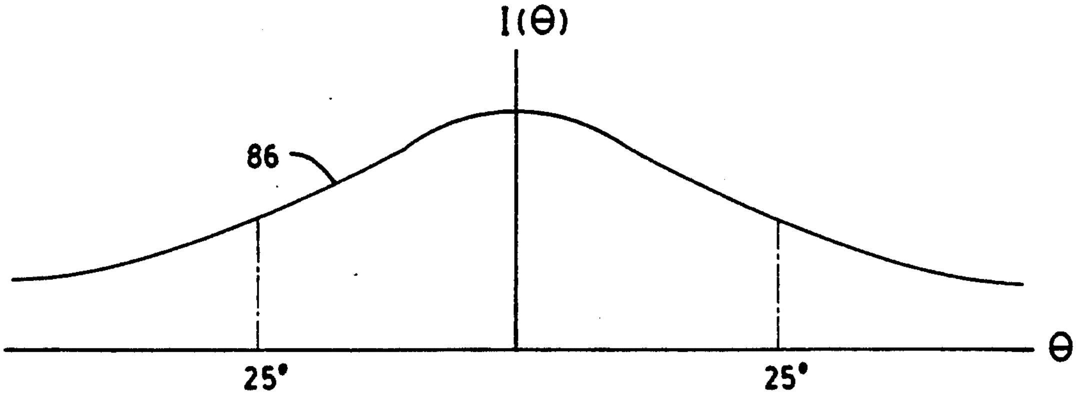

FIG. 9 shows a light intensity curve for a lens with elongated paraboloidal lenticules.

Figure 10:
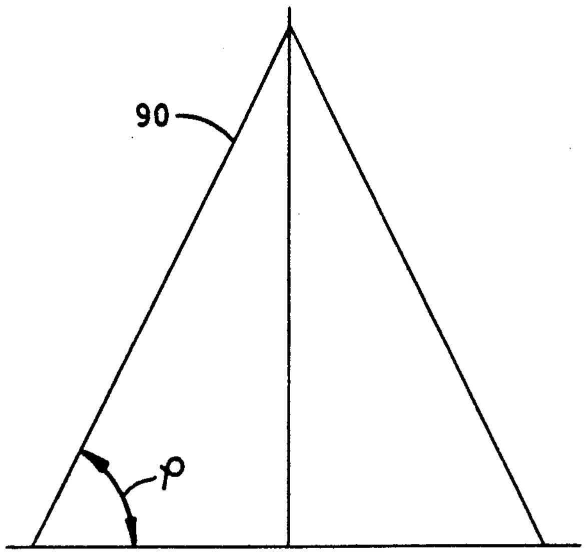

FIG. 10 shows a conical lenticule in axial cross section.

Figure 11:
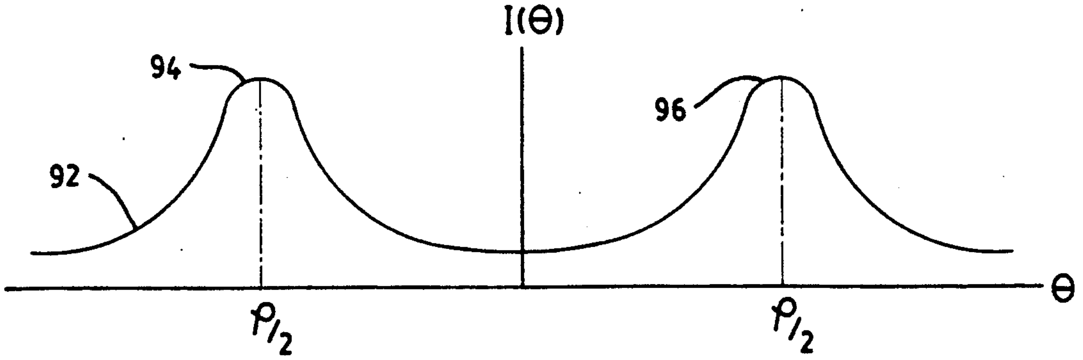

FIG. 11 shows a light intensity curve for a lens with conical lenticules

Figure 12:
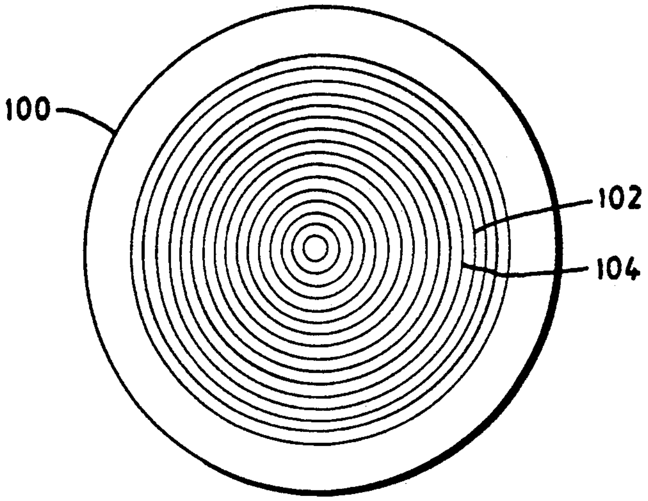

FIG. 12 shows an end view of a lens with concentric aspherical lenticules.

Figure 13:
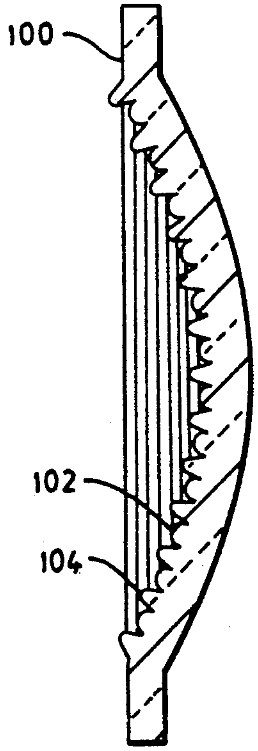

FIG. 13 shows a diametric cross section of the lens of FIG. 12.

BEST MODE FOR CARRYING OUT THE INVENTION

Figure 1:
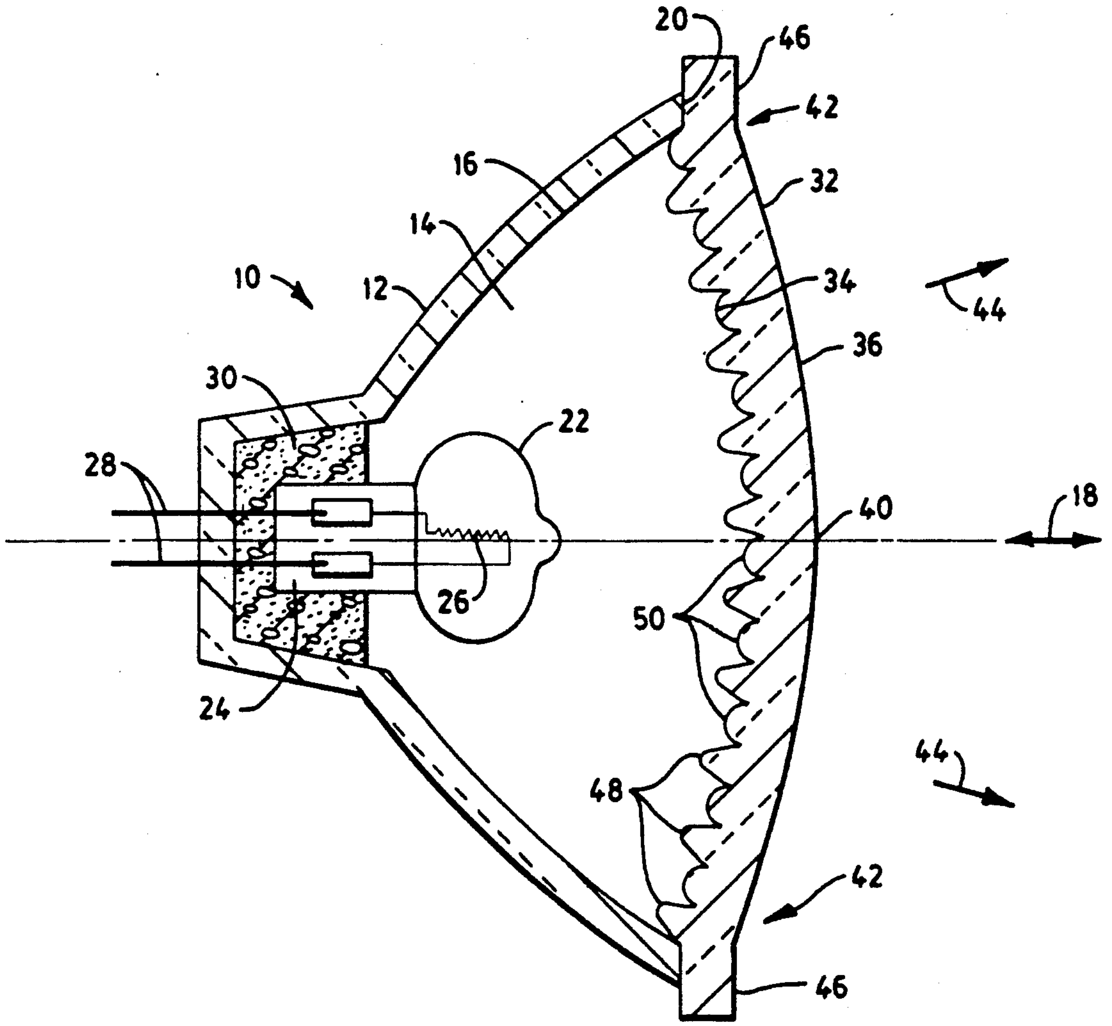
FIG. 1 shows a preferred embodiment of an electric lamp in cross section with a specially formed lighting lens with aspherical lenticules.

FIG. 1 shows a preferred embodiment of an electric lamp in cross section with a specially formed lighting lens. The electric lamp 10 for lighting an area comprises a reflector body 12 including a housing defining an included cavity 14 with a reflector surface 16 facing the included cavity 14. The reflector surface 16 may be formed on the inside or outside surface of the reflector body, and may comprise a metal coating, a layered dichroic or other reflective layer. In the preferred embodiment, the reflector surface 16 has the form of a paraboloid or similar surface of revolution with an optical axis 18. The reflector body 12 includes an opening for the cavity 14 facing away from the reflector surface 16, and defined by a rim 20. Positioned in the included cavity 14 is a means for generating light from electric energy, and in the preferred embodiment, the light source is a tungsten halogen lamp capsule 22 formed with a press seal 24. An arc discharge lamp, or other light source may also be used. In the preferred embodiment the filament 26 is aligned coaxially with the optical axis 18 of the reflector, but nothing here prevents transverse alignment. Extending from the lamp capsule 22 are two lamp leads 28 that are lead out through the base of the reflector housing for electrical connection of the lamp. In an example, the leads 28 extend through the back of the reflector body 12 to be exposed as two parallel prongs of sufficient gage to be used as plugs. The reflector body 12 and lamp capsule 22 may be coupled and held in position with respect to each other by a ceramic cement 30 or other coupling means.

Positioned across the reflector cavity 14 adjacent the rim 20 is a lighting lens 32. The lighting lens has the general form of a light transmissive plate facing the cavity 14 with a first side 34. An opposite, second side 36 faces the exterior. The lens 32 has an axial center point 40, and a optical edge 42 defining the edge of the projected light beam 44. Where the reflector is a surface of revolution, it is convenient that the lens 32 have a circular edge ring 46.

Facing the reflector cavity 14, the reflective surface 16 and the enclosed electric lamp capsule 22, and on the first side 34, are a multiplicity of aspherical lenticules 48. The first lenticules 48 may have an approximately elongated parabolic cross section. The aspherical lenticules 48 alternatively may be formed on the exterior face of the lighting lens, that is the second side 36, but the crevices between lenticules may collect dirt, making a lens with exterior lenticules difficult to keep clean. The lenticules 48 are therefore preferably formed on the first side 34 to be protected in the cavity 14.

The second side 36 may be flat, but is preferably a spherical section, with a flat edge ring 46. The spherical section form helps preserve the mechanical integrity of the lamp, while the edge ring 46 eases coupling for sealing and support.

The lens 32 may additionally include, intermixed with the aspherical lenticules 48, a second lenticule type 50. The second lenticules 50 may have an approximately circular cross section or any other cross section different from the first lenticule cross section. FIG. *2a* shows an end view of a preferred embodiment of a lens 32 with a single type aspherical lenticule 48 close packed to form a hexagonal pattern. FIG. *2b* shows a similar view of an alternative embodiment of a lens with a random mixture of equal numbers of a first aspherical lenticule 48, and a second type of lenticule 50.

FIGS. *3a–f* show axial cross sectional views of the several lenticule types. The lenticules may include spherical (FIG. *3a*), aspherical (e.g. elongated paraboloidal FIG. *3b*), conical (FIG. *3c*), ellipsoidal (prolate) (FIG. *3d*), pyramidal (FIGS. *3e*, *3f*), or similarly shaped cross sections taken in the direction of the optical axis 18. FIGS. *4a–f* show transverse cross sectional views, views normal to the lenticule axis, of the corresponding lenticules of FIG. 3.

The lenticules may be distributed across the first side 34 in an orderly pattern, such as a hexagonal close packing (FIG. *2a*), a rectangular, a concentric or similar regular pattern. Alternatively the lenticules may be distributed randomly (FIG. *2b*). The hexagonal close packed pattern is preferred. Preferably, the lenticules are aspheric and preferably have an approximately parabolic axial cross sectional form, and are evenly distributed across the first side 34 extending from the lens center point 40 to the optical edge 42, so substantially all of the beam light passes through the lenticules, and not outside the zone covered by the lenticules. The lenticules are also preferably closely packed, so little or none of the beam light passes between the lenticules. Alternatively, a multiplicity of second lenticules 50 with a different axial cross sectional form may be evenly distributed across the first side 34 to intermix in a regular pattern with the first lenticules 48. The cross sectional form of the second lenticules 50 may be circular, of a different approximately parabolic form, or of any still different form. FIG. 5 shows a hexagonal close packed pattern of two lenticule types 52, 54 of differing portions ranging from 2 to 1, to 8 to 1.

Lenticules change the fairly even input light distribution typical of a paraboloidal reflector to produce an output light distribution I(Θ) that varies principally in the direction normal to the lenticule's centerline. The lenticule contour in planes containing the lenticule's centerline therefore substantially defines the overall performance of the lenticule. A spherical lenticule 60 with centerline 62, as shown in axial cross section in FIG. 6, produces a light intensity distribution with respect to the axial angle Θ as shown approximately by intensity curve I(Θ) 66 in FIG. 7. The light intensity curve I(Θ) 66 of a spherical lenticule has a highly peaked bell shape indicating highly concentrated light in the central part of the beam. The intensity I(Θ) drops from a maximum at 0° to fifty percent (50%) at about 16°. Since the goal in area lighting or even subject lighting is an even light within the identified zone, the high concentration at the beam center is generally undesireable. It is known that truncating the spherical lenticules 60 at lens edge 64, for example, by packing spherical lenticules 60 closely, the edge of the beam intensity I(Θ) 66 drops Off more sharply. The beam intensity curve I(Θ) for truncated spherical lenticules is shown approximately by dashed lines 68.

FIG. 8 shows an elongated, and approximately paraboloidal lenticule in axial cross section. The aspherical lenticule 70 with centerline 72 has greater curvature near the lenticule axis, and less curvature near the lenticule base 74. The lenticule 70 measured across the base 74, has a width W; and measured along the axial centerline 72 perpendicular to the base 74 has a height $H_a$. The lenticule surface 80 is smooth, with a monotonically increasing radius of curvature from the axial height of the lenticule to the base 74. At the base of the aspherical lenticule 70, a tangent 82 forms a base angle α with the axial direction. A useful lenticule generally has a minimum base tangent angle α of about 25°. The 25° value is suggested because of rapidly increasing Fresnel reflection losses as the tangent angle α decreases, and is not the result of any absolute failure of the lenticule to distribute light.

The cross sectional curve for one class of such aspherical elongated lenticules is defined by the formula $Y = -AX^2N + B$. The origin is at the center of the base. X is measured across the base or diameter of the lenticule. Y is measured in the axial direction. N is greater than one half and not greater than about two, since the utility of the lenticule decreases as N exceeds unity. B is the height of the lenticule. A determines the elongation of the lenticule.

For comparison, the outline of a corresponding tangent spherical lenticule 84 is shown having the same base width W, with an axial height $H_s$, and truncated to have the same tangent base angle α. The preferred aspherical lenticule height $H_a$ is greater than the corresponding spherical height $H_s$. In the preferred paraboloidal lenticule, the ratio of the heights is $$H_a/H_s = \delta^2/2(1-\delta^2)^{\frac{1}{2}}(1-(1-\delta^2)^{\frac{1}{2}})$$

where δ is the common width W divided by twice the radius of the tangent spherical lenticule.

Other lenticules with greater height to diameter in comparison to a spherical lenticule with the same lenticule edge slope, including cones and pyramids, may be used. The preferred aspherical lenticule for nominally circular light patterns is also rotationally symmetric. These lenticules may be used to deliver light to narrow angular zones off angle from the lenticule axis, and as such are used in combinations to build up the light intensities off axis. The lenticule height should be at least an appreciable fraction of the lenticule width, and because of manufacturing limitations and increasing Fresnel reflection losses cannot greatly exceed the lenticule width. The lenticule height $H_a$ should then be at least a tenth the lenticule width W, and probably no more than four times the lenticule width W. The preferred range is from one fifth to twice the lenticule width.

An elongated, and approximately parabolic lenticule, such as lenticule 70, produces a light intensity I(Θ) with respect to the axial angle Θ as shown approximately by FIG. 9. FIG. 9 shows a light intensity curve I(Θ) 86 with a flatter bell shape indicating relatively less light intensity near the beam center and more near the beam edge. The intensity drops from a maximum at 0° to fifty percent (50%) at about 25° for an elongated paraboloidal lenticule. Some elongated aspherical lenticules may have high pointed tops that are not easily molded. The mold material may not fully fill the mold. Also, due to cooling differences, the tip of an elongated lenticule may be deformed. As a result, the tip of an elongated lenticule may not be ideally shaped. A misshapen tip fails to accurately control light, thereby tending to further reduce the beam intensity near the beam center.

A conical shaped lenticule 90 having straight sides, a base angle φ and a circular base, as shown in FIG. 10, produces a light intensity curve I(Θ) 92 with respect to the axial angle Θ as shown approximately in FIG. 11. FIG. 11 shows a light intensity curve I(Θ) 92 with relatively little light falling near the beam center, and having two equally spaced peaks 94, 96 offset from the beam center by an amount determined approximately by the base angle φ of the lenticule cone 90. A mixture of conical lenticules with two or more base angles $\phi_i$ may be used to build up a chosen each with base angle $\phi_i$ less than or equal to twice the desired beam angle to yield a beam with an approximately flat central distribution and a relatively sharp drop off at the desired maximum beam angle. Cones may also be angled with respect to the optical axis, thereby affecting the intensity distribution I(Θ) peak height, and peak offset.

Figures 3A, 3B, 3C, 3D, 3E, 3F:
Figures 4A, 4B, 4C, 4D, 4E, 4F:
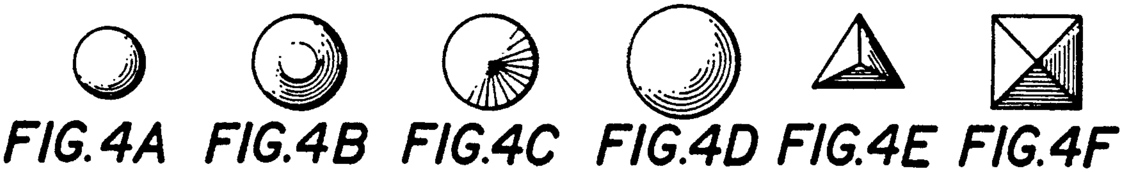
Figure 5A:
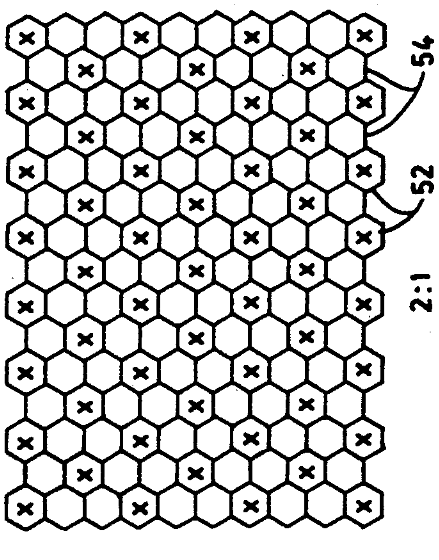
Figure 5B:
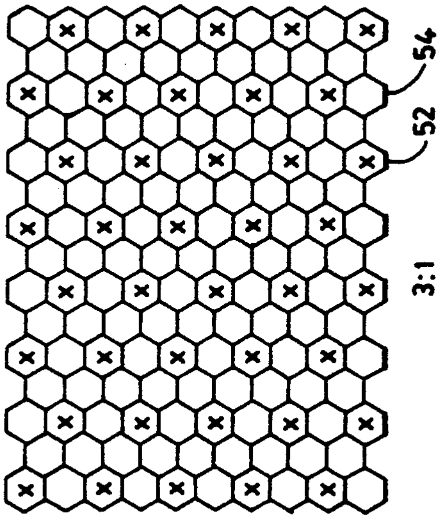
Figure 5C:
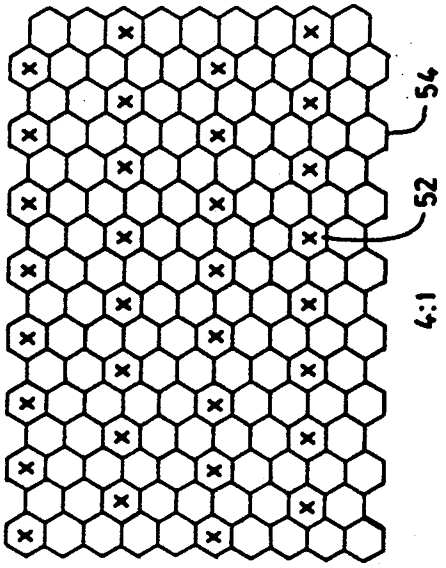
Figure 5D:
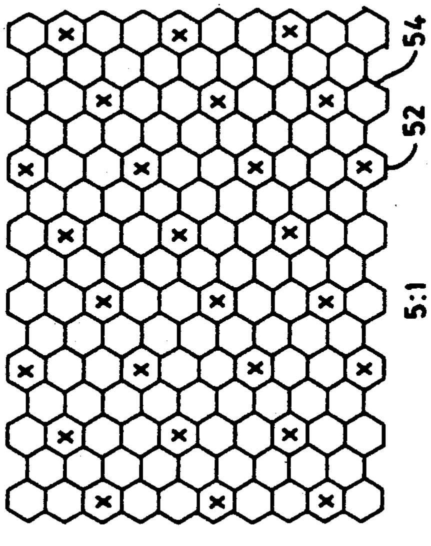
Figure 5E:
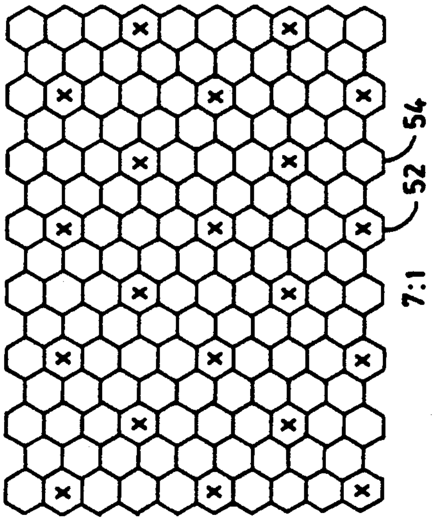
Figure 5F:
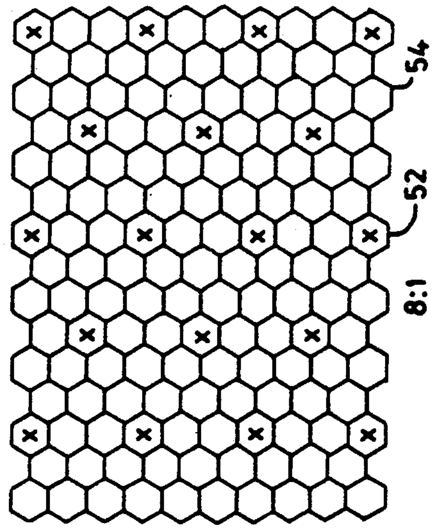

A rectangular based pyramidal lenticule, FIG. 3f, having straight sides, produces a similarly two peak light intensity distribution I(Θ) with respect to the axial angle Θ. The pyramidal lenticule tends to produce a square or rectangular light pattern, the height and width of which may differ according to the two base angles ($\phi_1$, $\phi_2$) of the pyramid. clearly, other lenticule forms may be developed, each with a characteristic light intensity curve I(Θ), and pattern. For example, polygonal, ellipsoidal, cylindrical, toroidal, and other familiar forms may be used.

In a further variation, the transverse lenticule shape need not be confined to the round or hexagonal shape of packed beads, but may also have a varying length and width. Lenticules with elongated axial cross sections may be formed as concentric rings, each ring having a section perpendicular to the supporting plate that is aspherical. Elongated lenticules may then be formed as parallel ribs, radial ribs, or similar linear structures, again each with a characteristic axial cross section. In particular, alternate rings, ribs, or rays may be chosen in proportion to a determined weighting to yield a desired output pattern. It is somewhat easier to evenly intermix closely pack cellular type lenticules in proportion to a determined weighting, and the result may be consistent, but the mixing of rings, ribs, rays or similar alternative linear type lenticule structures in proportion to a determined weighting is acceptable. In particular, cutting a mold with varying concentric set of lenticule type rings is felt to be useful. FIG. 12 shows a lens 100 with concentric lenticule ribs (rings) 102, 104 at least one set of the ribs have aspherical cross sections. FIG. 13 shows the lens of FIG. 12 in diametric cross section showing the ribs (rings) 102, 104 as having aspherical cross sections. A mix of lenticule types with each lenticule type having nearly a uniform distribution over the lens face is felt to be more useful.

A lighting lens providing a desired light intensity pattern may be formed by first selecting a first lens sample formed from a multiplicity of a first lenticule type providing a first light intensity $I_1(\Theta)$ pattern Although a lens sample may be chosen having a pattern of multiple lenticule types, selecting a sample with only one lenticule type is thought to be easier to work with. The chosen lens sample may have any particular lenticule that the designer may elect. Since the designer knows the pattern that is desired $I_d(\Theta)$, it is convenient to chose a first lenticule sample with a light intensity distribution $I_1(\Theta)$ similar to the desired intensity pattern $I_d(\Theta)$.

The next step is to select a second lens sample formed from a second, different, lenticule type providing a second light intensity pattern $I_2(\Theta)$. The second lens sample may also be conveniently formed from a multiplicity of the second lenticule type to provide a second light intensity pattern. Again, a lens sample exhibiting only one lenticule type is preferred. Preferably, the second lenticule intensity pattern generally falls on the opposite side of the desired intensity pattern relative to the first lenticule intensity pattern. Since the first intensity pattern may cross the back and forth across the desired intensity pattern, the ideal second pattern should cross back and forth across the desired pattern going in the opposite direction to the crossings by the first pattern (relatively inverse). The first and second intensity patterns then approximately bracket the desired pattern, section by section. A method of locating an appropriate second lenticule type is to subtract the first intensity pattern $I_1(\Theta)$ from the desired intensity pattern $I_d(\Theta)$ yielding a residual intensity pattern $I_r(\Theta)$. The second lenticule sample is then chosen to whose intensity pattern $I_2(\Theta)$ approximates the residual intensity pattern $I_r(\Theta)$.

The third step is to determine a weighted combination of the first light intensity pattern, and the second light intensity pattern providing a light intensity distribution nearest the desired light intensity pattern. By interpolating between the two intensity distributions, a relative weighting w of the two sample light intensity distributions may be found that approximates the desired intensity distribution.

$$I_d(\Theta)=w(_1(\Theta))+(1-w)(I_2(\Theta))$$

The weighting w may be made at a particularly significant curve position $\Theta_1$. Alternatively, several (n) positions $\Theta_i$ may be chosen with corresponding weightings made $w_i$ which may be averaged, $w=\Sigma w_i/n$, or weight averaged $w=\Sigma N_i w_i/\Sigma N_i$. A new lenticule pattern is then formed with the two sample types of lenticules mixed, and in proportion to the determined relative weighting w.

At this stage, an additional lens sample may be chosen and similarly composited with the existing samples in a weighted total. In this manner there is no limit to the number of lenticule types that may be combined to approximate the desired result. Practically though, lenticules have a finite size, and the combined pattern depends on the assumed multiplicity of lenticules of a given type in the final product. The number of successive samples that may be successfully combined depends in part on the number of lenticules to be formed on the lens. If several thousand lenticules were to be formed, combining ten lenticule types would be acceptable, whereas if only a hundred lenticules were to be formed, two or three lenticule types would be more appropriate for creating the desired intensity pattern.

Figure 2A:
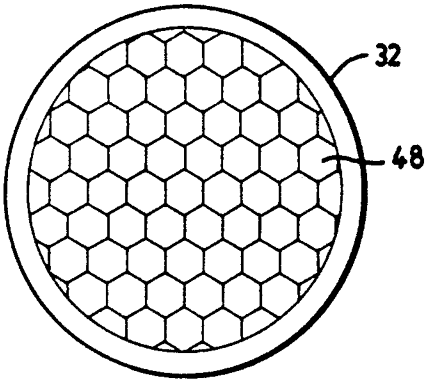
Figure 2B:
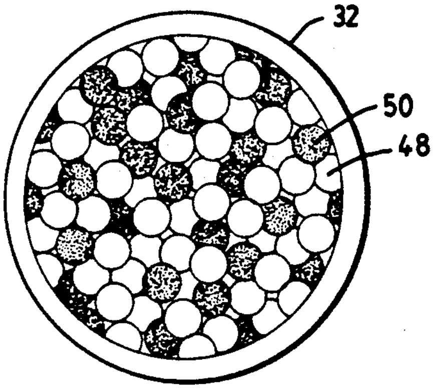

The last step is to form a composite pattern of the chosen lenticule types in proportion to the determined weighting. Individual lenticules of the chosen types are distributed across the lens face in proportion to the determined weighting For example, if the desired pattern calls for an eighty percent (80%) contribution from the first sample intensity distribution, and a twenty percent (20%) contribution from the second sample intensity distribution, then eighty percent (80%) of the formed lenticules should be of the first sample type, and twenty percent (20%) from the second sample type. The pattern for the composite may be chosen from any convenient design. The preferred pattern is a hexagonal close packing design with a regular patterning of the lenticule types within the hexagonal cells. FIGS. 5*a–f* show hexagonal close packings of two lenticule types in differing proportions. The hexagonal close packing covers the lens tightly with little space allowed for leakage between lenticules, or around the lens edge. Other acceptable patterns include rectangular, polar, concentric or other patterns. A random distribution is also permissible (FIG. 2*b*).

With the weighted pattern determined, the final product is made producing the desired pattern. In particular, in the preferred method, a numerically controlled milling machine is programmed with the chosen lenticule contour, and position information and directed to cut a master mold. The lens plate is molded with the desired lenticule pattern. Direct manufacture is a possible alternative.

The present method of composing a final lens from a variety of different lenticule types provides a further manufacturing advantage. The preferred method enables a library of lenticule contours, and lenticule position patterns to be built in advance. The process of programming the milling machine is then merely to input the appropriate contour and position library information.

Alternatively, a mold may be hand made. To make a final female master mold, a first male premold may be made with a first lenticule type forming a basic pattern, but with regularly positioned gaps in the pattern. For example, the pattern in FIG. 5*a* may be chosen with the a 2:1 ratio, with the positions marked 52 occupied by first lenticule projections. The complementary positions marked 54 are not filled, but left as flat sections. A second male premold may be formed with a second lenticule type forming a complementary pattern to the first premold. For example, the same pattern in FIG. 5*a* but with the positions marked 52 not filled, but now left as flat sections. The complementary positions marked 54 are occupied by second lenticule projections. The first male premold may be applied to a final female master mold, followed by the application of the complementary second male premold to the final mold. The gaps of the first male premold are then filled in by the complementarily positioned second male premold lenticules. Repeated applications may be necessary to accommodate the slight distortion of the previous impression. The final female mold then has a complete pattern, with lenticules of the first and second types in proportion to filled and gap positions of the first premold. A series of premolds may then be made of each lenticule type, with a fixed portion of gaps. A second series of complementary premolds may similarly be made of the second lenticules types. A specific lens may then be made by selecting a first premold with the first chosen lenticule, and with the selected weighting for that lenticule. The selected first premold is then applied to the final mold. The second premold is then chosen from the chosen second lenticule type with the complementary pattern to fill the gaps of the chosen first premold. The second complementary premold is then applied to the final mold to make a complete lens master. With the series of complementary premolds, lenticule types and proportions may be quickly interchanged to created final master molds resulting in lenses closely adapted to specific purposes.

A working example sealed electric lamp with a lens having multiple lenticules was made. The reflector was formed as part of a unitary glass reflector and lamp base. The paraboloidal reflector had an opening diameter of about 4.0 cm (1.58 inch) and was about 2.5 cm deep having a focal length of 5.41 mm (0.213 inch). An aluminum reflective coating was flashed on the inside of the reflector. Extending from the back of the reflector was a frustrum of a rectacular pyramid having a rectangular passage extending from the back of the reflector to end of the base. Positioned in the reflector was a twelve volt, fifty watt tungsten halogen lamp capsule with leads extended through the passage. The lamp capsule was positioned and held in place by a ceramic cement, leaving the leads exposed as connection prongs. Across the opening of the reflector, on an inward facing lip was a cover lens. The cover lens had the form of a spherical section with a flat edge even with the rim of the reflector and extending 1.0 mm to a smoothly arced surface facing the exterior of the lamp. The face arc had a radius of about 30.0 cm. The cover lens was bonded to the rim of the reflector.

On the interior of the lens were a 199 lenticules arranged in a hexagonal close packed pattern. The boundaries were regular hexagons of 2.54 mm (0.100 inch) width and 2.92 mm (0.115 inch) diagonal. Forty-eight (48) of the lenticules were sections of truncated spheres with a 1.57 mm (0.062 inch) radius. One hundred and twenty-three (123) of the lenticules, were paraboloidal lenticules with a focal length of 0.444 mm (0.0175 inch). Twenty-eight (28) of the lenticules, were paraboloidal lenticules with a focal length of 0.558 mm (0.022 inch). The lenticules were arranged in a regular alternating pattern. The intensity distribution with respect to angle from the optical axis showed a slowly decreasing light level to about 30° where there was rapid drop off.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A method of forming a lighting lens providing a desired light intensity pattern comprising the steps of:

a) selecting a first sample lens having a multiplicity of a first aspherical lenticule type providing a first light intensity pattern, b) selecting an additional sample lens having a multiplicity of lenticules of a type different from the first aspherical lenticule type providing an additional light intensity pattern, c) determining a weighted combination of the first light intensity pattern, and the additional light intensity pattern providing a light intensity distribution approximating the desired light intensity pattern, and d) forming a lighting lens having a distribution of lenticules of the first type, and lenticules of the additional type in proportion to the determined weighting.

2. The method in claim 1, wherein selecting the second sample lens includes subtracting the first light intensity pattern from the desired light intensity pattern to determine a residual light intensity pattern, and then selecting the additional sample lens with a light intensity pattern approximately equal to the residual light intensity pattern.

3. The method in claim 1, wherein selecting the additional sample lens includes selecting a light intensity pattern approximately inverse, segment by segment, from the first light intensity pattern with respect to the desired light intensity pattern.

4. The method in claim 1, further including, after step c, the steps of treating the existing weighted combination as a first sample lens, and repeating steps of selecting an additional sample lens and determining a weighted combination of the first sample lens and the additional sample lens.

5. The method in claim 1, wherein the step of determining a weighted combination includes interpolating between the first light intensity pattern and the second light intensity pattern to determine a weighting.

6. The method in claim 5, wherein multiple interpolation points are chosen to determine corresponding multiple weightings, and then averaging the multiple weightings.

7. The method in claim 6, wherein the averaging is a numeric averaging.

8. The method in claim 6, wherein the averaging is a weighted averaging.

9. The method of claim 1, wherein the step of forming includes closely packing the lenticules.

10. The method of claim 1, wherein the step of forming includes distributing the lenticules across the lens to substantially cover the lens from an optical center to an optical edge of the lens.

11. The method of claim 1, wherein the step of forming includes distributing the first, and additional lenticules in a random pattern.

12. The method of claim 1, wherein the step of forming includes distributing the first, and additional lenticules in a regular pattern.

13. The method of claim 12, wherein the step of forming includes distributing the first, and additional lenticules in a regular closely packed hexagonal pattern.

* * * * *